(12) United States Patent
Lee

(10) Patent No.: US 9,102,343 B2
(45) Date of Patent: Aug. 11, 2015

(54) ELECTRIC CART APPARATUS

(71) Applicant: Hyundai Motor Company, Seoul (KR)

(72) Inventor: Seong Hoon Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/477,102

(22) Filed: Sep. 4, 2014

(65) Prior Publication Data

US 2015/0097358 A1    Apr. 9, 2015

(30) Foreign Application Priority Data

Oct. 7, 2013   (KR) .......................... 10-2013-0119519

(51) Int. Cl.
*B62B 1/00*        (2006.01)
*B62B 5/00*        (2006.01)
*B60B 19/00*       (2006.01)
*B62B 3/02*        (2006.01)

(52) U.S. Cl.
CPC ............. *B62B 5/0003* (2013.01); *B60B 19/003* (2013.01); *B62B 3/027* (2013.01); *B62B 5/0076* (2013.01)

(58) Field of Classification Search
CPC ................ B62B 5/0083; B62B 35/109; B62B 2310/305
USPC ............. 280/35, 638, 29, 639, 641, 645, 652, 280/676
See application file for complete search history.

(56) References Cited

U.S. PATENT DOCUMENTS

| 3,498,628 | A | * | 3/1970 | Ferneau et al. | ............... | 280/641 |
| 7,681,893 | B2 | * | 3/2010 | Liu et al. | .......................... | 280/35 |
| 8,083,253 | B1 | | 12/2011 | Butler | | |

FOREIGN PATENT DOCUMENTS

| JP | H04-011558 A | 1/1992 |
| JP | 2004299494 A | 10/2004 |
| JP | 2006-155039 A | 6/2006 |
| JP | 4211459 B2 | 1/2009 |
| KR | 10-2003-0084458 | 11/2003 |
| KR | 10-2013-0009249 A | 1/2013 |

* cited by examiner

*Primary Examiner* — John Walters
*Assistant Examiner* — James Triggs
(74) *Attorney, Agent, or Firm* — Mintz Levin Cohn Ferris Glovsky and Popeo, P.C.; Peter F. Corless

(57) ABSTRACT

An electric cart apparatus includes a basket in which objects are to be held. A plurality of front and rear legs is erected downward from the basket. First ends of oblique links are coupled with the basket. Second ends of the oblique links are coupled with lower sections of the front legs. Each of the oblique links is divided into an upper link and a lower link. The lower link has a sliding slot which extends in a lengthwise direction. The upper link has a link engagement portion which is to move along the sliding slot. First ends of auxiliary links are coupled with link coupling portions of the oblique links. Second ends of the auxiliary links are coupled with central portions of the rear legs. Wheels are coupled with lower ends of the front and rear legs.

15 Claims, 8 Drawing Sheets

ELECTRIC CART APPARATUS

CROSS-REFERENCE TO RELATED APPLICATION

This application claims under 35 U.S.C. §119(a) the benefit of Korean Patent Application No. 10-2013-0119519 filed on Oct. 7, 2013, in the Korean Intellectual Property Office, which is hereby incorporated by reference in its entirety.

BACKGROUND (1) Technical Field

The present invention relates, in general, to an electric cart apparatus which can be easily put into and taken out of a trunk of a car.

(2) Description of the Related Art

Generally, when a person goes shopping at a supermarket or the like, he or she arrives in a car, loads necessary goods into a cart while pushing the cart, loads the goods into his/her car trunk, returns home, and takes out the goods from the trunk and moves the goods into his/her home. This type of shopping requires a lot of labor and is inconvenient.

In order to overcome the foregoing problem, Japanese Patent Publication No. 2004-299494 proposed a foldable shopping cart that can be put into a car. This shopping cart includes a frame, a pair of front wheel supporting legs, a pair of rear wheel supporting legs and a guide part. A handlebar is provided on the rear upper portion of the frame. The upper portion of each of the front wheel supporting legs can swing between a working position that extends in the upward-downward direction and a folding-up position that springs up backward. The front wheel supporting legs are provided with front wheels at both sides of the front bottom of the frame. The rear wheel supporting legs are supported on both sides of the rear bottom of the frame through two links so as to extend and move in the upward-downward direction at the working position that extends in the upward-downward direction and a position that is behind the working position. Rear wheels are provided on the bottom of the rear wheel supporting legs. The guide part is provided on the front lower portion of the frame at a position that is in front of or behind the position when the front wheel supporting legs are pushed.

However, the links are unbalanced when they are connected to the wheels while being folded on the bottom of the basket. Consequently, the shopping cart may fall down due to vibration or impact occurring in a car, thereby damaging goods, which is problematic.

The information disclosed in the Background of the Invention section is only for the to enhancement of understanding of the background of the invention, and should not be taken as an acknowledgment or any form of suggestion that this information forms a prior art that would already be known to a person skilled in the art.

SUMMARY

An electric cart apparatus is provided in which links connected to wheels are not positioned below a basket so as to protect goods from vibration or impacts caused by a car while the car is being driven, and when the electric cart apparatus can be used easily by a user.

According to one aspect of the present invention, there is provided an electric cart apparatus that includes: a basket in which objects are to be held; a plurality of front and rear legs which are erected downward from the basket; oblique links, wherein first ends of the oblique links are coupled with the basket and second ends of the oblique links are coupled with lower sections of the front legs, each of the oblique links is divided into an upper link and a lower link, the lower link having a sliding slot which extends in a lengthwise direction, and the upper link having a link engagement portion which is to move along the sliding slot; auxiliary links, wherein first ends of the auxiliary links are coupled with link coupling portions of the oblique links and second ends of the auxiliary links are coupled with central portions of the rear legs; and wheels coupled with lower ends of the front and rear legs.

The electric cart apparatus may further include a handlebar provided on a rear portion of the basket.

The basket may include an inclined section on a lower edge of a rear portion, the inclined section being inclined inward and downward from a side surface of the basket at a predetermined angle.

One end of each of the oblique links may be coupled with a lower portion of the inclined section of the basket.

The front legs may be coupled with the front portions of the basket, thereby forming coupling portions between the basket and the front legs. The front legs and the rear legs may rotate about the coupling portions which act as the center of rotation when putting or taking the electric cart apparatus into or out of a car.

Each of the front and rear legs may include a joint at a central portion thereof. An upper leg of each of the front and rear legs is retracted into or withdrawn from a lower leg of each of the front and rear legs about the joint so that the basket is lifted or lowered about the joint so that a height of the basket is to be adjusted.

Each of the front and rear legs may include an actuator such that the basket is lifted and lowered about the joint in response to an operation of the actuator so that the height of the basket is to be adjusted.

Each of the rear legs may include a joint at a central portion such that each of the rear legs is bendable at a predetermined angle in a predetermined direction.

The electric cart apparatus may further include reinforcement links provided on lower portions of the front and rear legs so as to form a shape of a quadrangle, four vertices of the quadrangle being positioned at the front and rear legs, respectively.

The oblique links may be disposed on both sides of the basket. The electric cart apparatus may further include a support link which connects link engagement portions of the oblique links to each other in a transverse direction.

The oblique links and the auxiliary links may define a "Y" shape, an angle defined by the upper and lower links of each of the oblique links staying constant.

The upper link of each of the oblique links may have a first extension protruding downward. Each of the auxiliary links may have a second extension protruding upward from a position that corresponds to the first extension. The first extension can couple with or decouple to from the second extension via a first stopper.

The lower link of each of the oblique links may have a first protrusion protruding upward. The upper link of each of the oblique links may have a second protrusion protruding downward. The first protrusion can couple with or decouple from the second protrusion via a second stopper.

The wheels may be Mecanum wheels.

The basket, the front legs, the rear legs, the oblique links, the auxiliary links and the wheels may be electrically connected via one signal and be selectively controlled by the actuator so as to be individually or simultaneously locked or unlocked.

The basket may be provided with a receiver device, and a transmitter device may be provided outside the electric cart apparatus. The receiver device detects a signal from the transmitter device such that the electric cart device follows the transmitter device.

According to the electric cart apparatus having the above-described configuration, a user can conveniently go shopping since the cart follows the user without the user having to push the cart. It is possible to put or take the heavy cart into or out of a trunk of a car by slightly pushing or pulling the handlebar. The electric cart apparatus eliminates the inconvenience of moving heavy goods, and is easily applicable to a vehicle such as a sport utility vehicle (SUV) or crossover vehicle in which the trunk is positioned high, and can be easily operated due to a simple structure.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
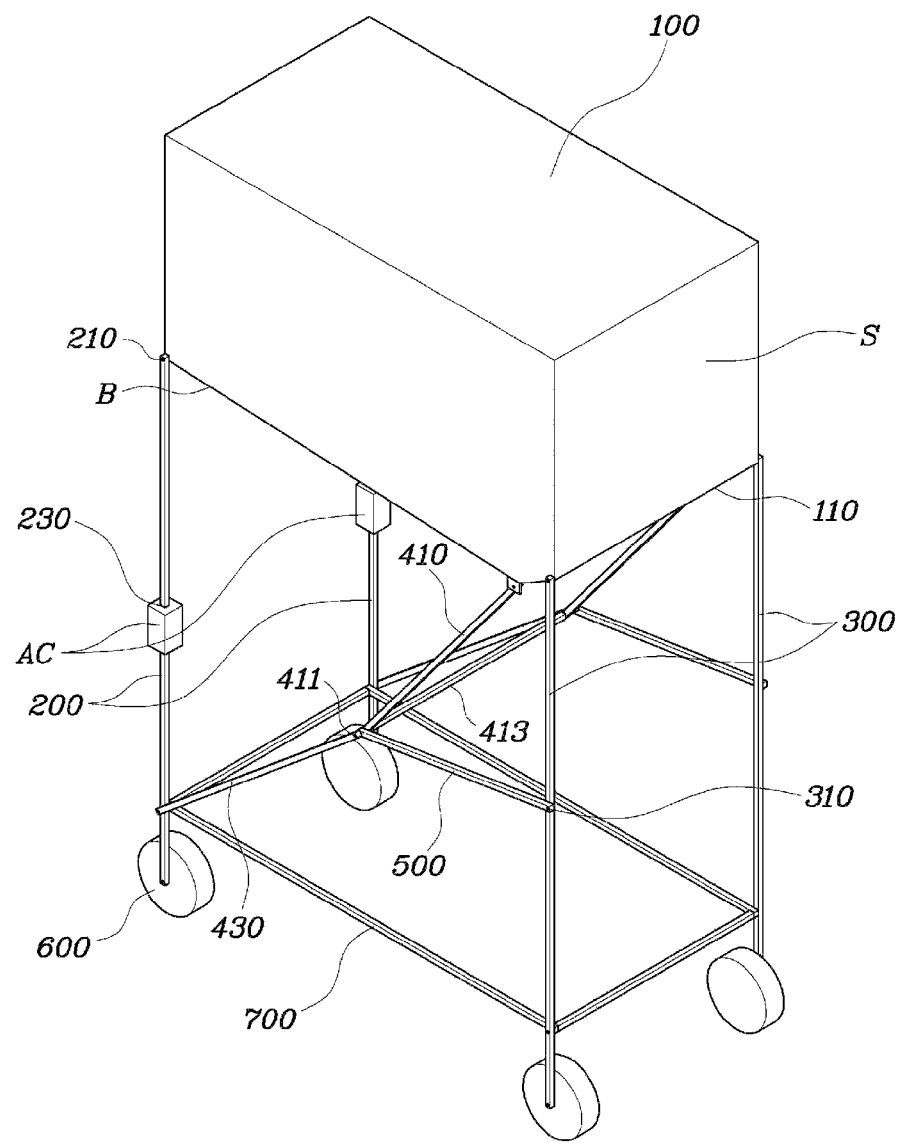
FIG. 1 is a perspective view showing an electric cart apparatus according to an embodiment of the present invention.
Figure 2:
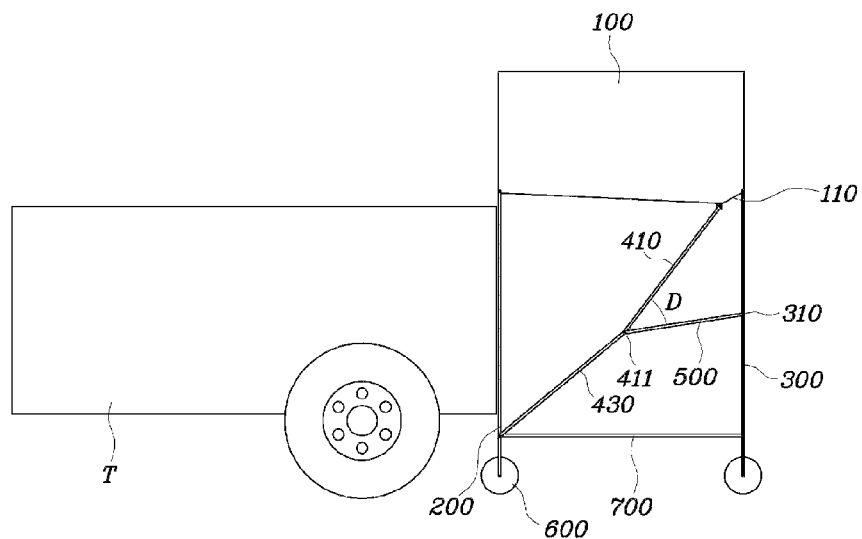
FIG. 2 is a schematic view showing a first operation stage when the electric cart apparatus is put into a car.
Figure 3:
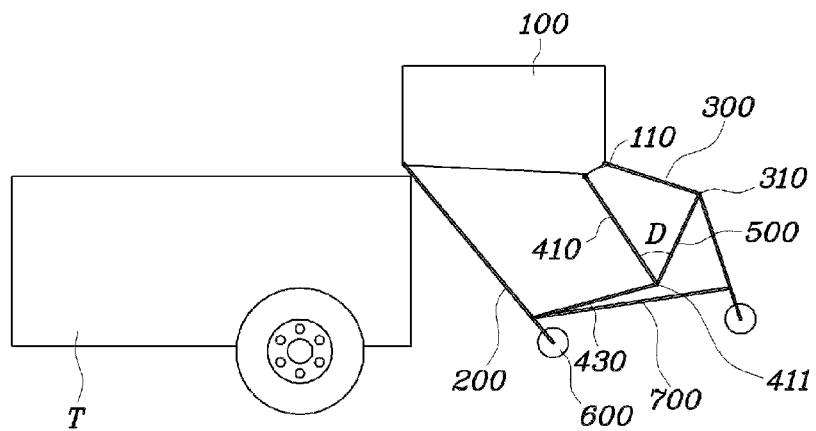
FIG. 3 is a schematic view showing a second operation stage when the electric cart apparatus is put into the car.
Figure 4:
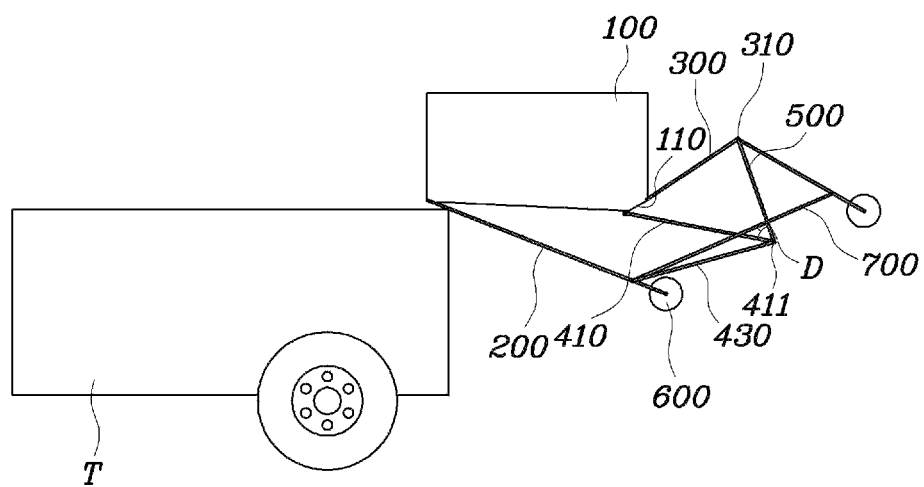
FIG. 4 is a schematic view showing a third operation stage when the electric cart apparatus is put into the car.
Figure 5:
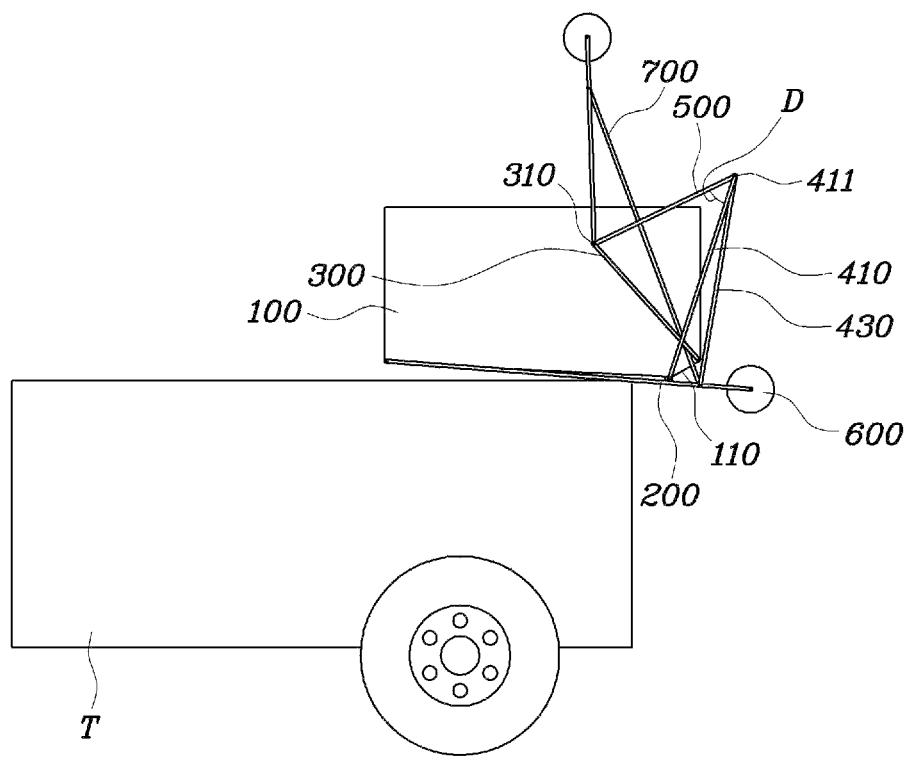
FIG. 5 is a schematic view showing a fourth operation stage when the electric cart apparatus is put into the car.
Figure 6:
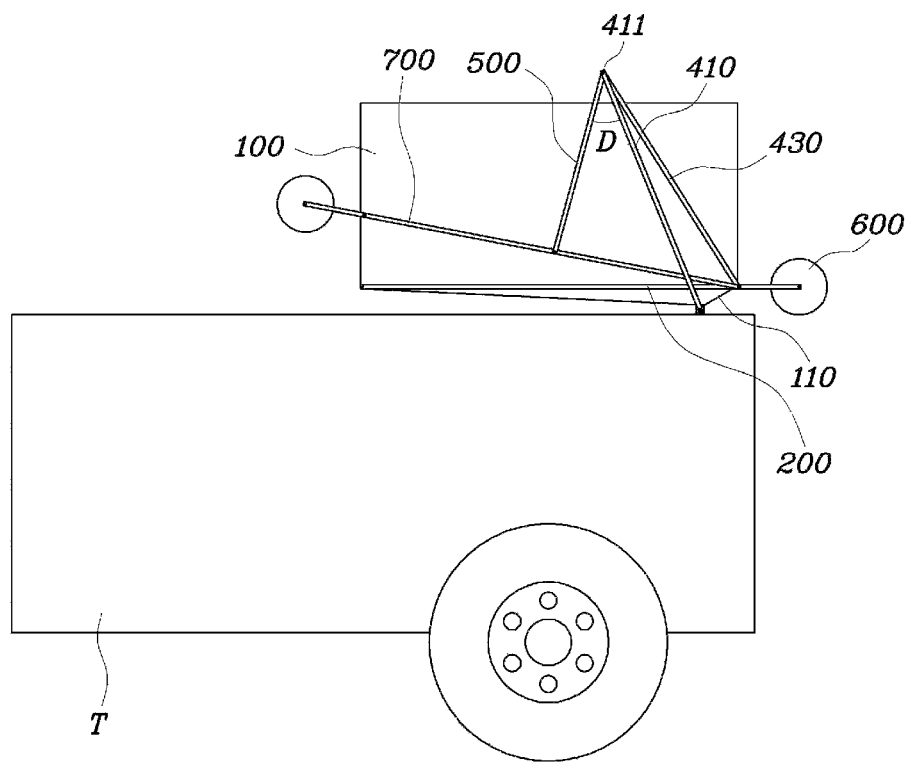
FIG. 6 is a schematic view showing a fifth operation stage when the electric cart apparatus is put into the car.

Reference will now be made in greater detail to an electric cart apparatus according to a preferred embodiment of the present invention, an example of which is illustrated in the accompanying drawings. Wherever possible, the same reference numerals will be used throughout the drawings and the description to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 7:
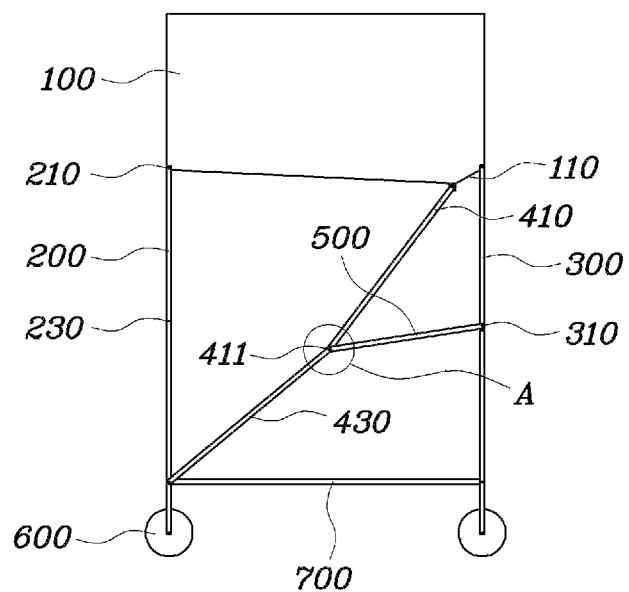
FIG. 7 is a schematic view showing a first operation stage when the electric cart apparatus is taken out of the car.
Figure 8:
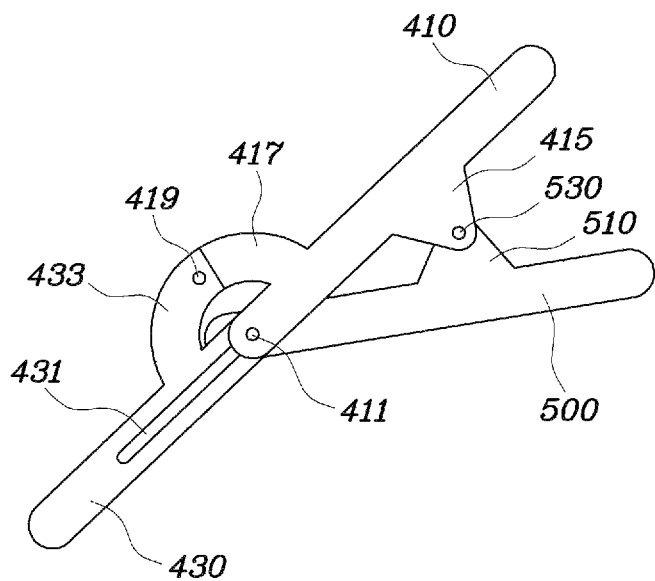
FIG. 8 is an enlarged view of part "A" in FIG. 7.
Figure 9:
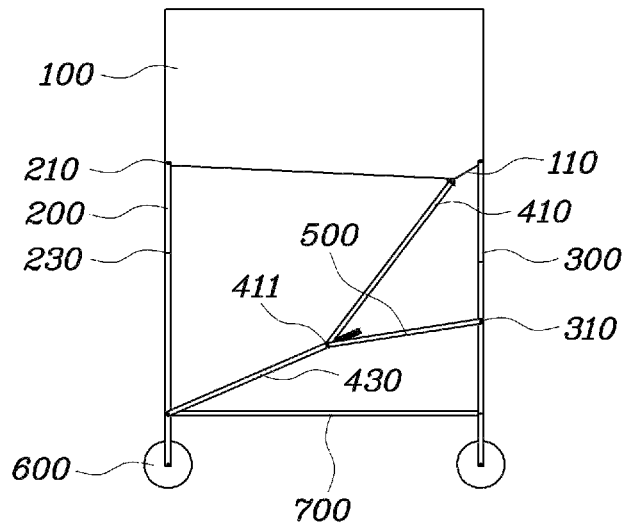
FIG. 9 is a schematic view showing a second operation stage when the electric cart apparatus is taken out of the car.
Figure 11:
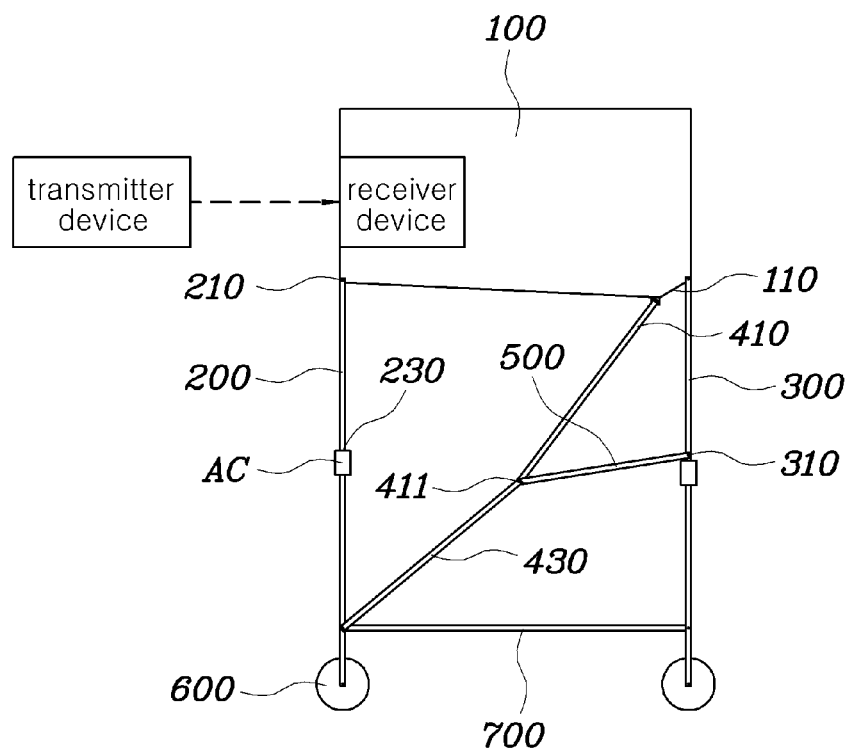
FIG. 11 is a schematic view showing examples of components with which the electric cart apparatus performs a follow-up function.

FIG. 1 is a perspective view showing an electric cart apparatus according to an embodiment of the present invention, FIGS. 2-6 are views showing operation stages in sequence when the electric cart apparatus is put into the car, and FIGS. 7-9 are views showing operation stages in sequence when the electric cart apparatus is taken out of the car. FIG. 11 is a view showing examples of components with which the electric cart apparatus performs a follow-up function.

An embodiment of the present invention provides an electric cart apparatus which can be put into a trunk of a car, in particular, a sport utility vehicle (SUV) or crossover-type vehicle, although the term "car" encompasses any suitable vehicle. The electric cart apparatus is based on a four-joint link structure. The electric cart apparatus includes a basket 100 in which objects can be held, a plurality of front legs 200 and a plurality of rear legs 300 which are erected downward from the basket 100, and oblique links 400, of which upper ends are coupled with the basket 100 and the lower ends are coupled with lower sections of the front legs 200. Each of the oblique links 400 is divided into an upper link 410 and a lower link 430. As shown in FIG. 8, the lower link 430 has a sliding slot 431 which extends in the lengthwise direction, and the upper link 410 has a link engagement portion 411 which is to move along the sliding slot 431. The electric cart apparatus also includes auxiliary links 500, in which first ends thereof are coupled with link coupling portions 411 of the oblique links 400, and second ends thereof are coupled with center portions of the rear legs 300. The electric cart apparatus also includes wheels 600 which are coupled with lower ends of the front and rear legs 200 and 300, respectively.

The basket 100 is any suitable basket which is used to carry goods during shopping in a supermarket or the like. For user convenience, a handlebar (not shown) is provided on the rear portion of the basket 100. The wheels 600 preferably are implemented as Mecanum wheels such that the electric cart apparatus can be moved easily in any direction.

In addition, the basket 100, the front legs 200, the rear legs 300, the oblique links 400, the auxiliary links 500 and the wheels 600 are configured so as to be electrically connected by a single signal. It is therefore possible to individually or simultaneously lock or unlock the respective parts by selectively controlling them using a plurality of actuators AC. The actuators AC can be formed on the operating parts, respectively, or one actuator AC can control all of the operating parts. This can be modified variously depending on the design.

The basket 100 has an inclined section 110 on the lower edge of the rear portion. The inclined section 110 is inclined inward and downward from the side surface of the basket 100 at a preset angle. The upper ends of the oblique links 400 are coupled with the lower portion of the inclined section 110. The upper ends of the upper links 410 are coupled with the bottom portions of the inclined section 110 that are distanced inward a preset length from the edge of the basket 100 instead of being coupled with the edge of the basket 100. When putting the electric cart apparatus into the car, this configuration facilitates rotation of the front and rear legs 200 and 300 and the links such that the front and rear legs 200 and 300 and the links can be completely rotated by an angle of about 270° so as to be put into the trunk T.

The front legs 200 are coupled with the front portions of the basket 100, thereby forming coupling portions 210 between the basket 100 and the front legs 200. The electric cart apparatus is put into the car by rotating the front legs 200 and the rear legs 300 counterclockwise about the coupling portions 210 which act as the center of rotation. In particular, the front legs 200 and the rear legs 300 are rotated completely to the floor of the trunk T so as to be put into the trunk. On the other hand, the electric cart apparatus is taken out of the car by rotating the front legs 200 and the rear legs 300 clockwise about the coupling portions 210.

Joints 230 and 310 are formed at the central portions of the front legs 200 and the rear legs 300, the upper sections of the legs 200 and 300 are retracted into or withdrawn from the lower sections of the legs 200 and 300 about the joints 230 and 310. Actuators AC are provided on the joints 230 and 310 of the front and rear legs 200 and 300. The basket 100 is lifted and lowered about the joints 230 and 310 in response to the operation of the actuators AC, so that the height of the electric cart apparatus can be adjusted. The lower sections of the legs 200 and 300 can be retracted into or withdrawn from the upper sections of the legs 200 and 300.

In addition, the joints 310 provided in the rear legs 300 allow the rear legs 300 to be bent a preset angle in a particular direction about the joints 310. When putting the electric cart apparatus into the trunk T, it is possible to rotate the rear legs 200 to an angle of about 270° by reducing the length of the rear legs 200 so that the electric cart apparatus can be put into the trunk T of the car.

Reinforcement links 700 are additionally provided on the lower portions of the front and rear legs 200 and 300 so as to form the shape of a rectangle, four vertices of which are positioned at the lower ends of the front and rear legs 200 and 300. When the electric cart apparatus is used as a cart, the reinforcement links 700 more firmly support the electric cart apparatus.

The oblique links 400 and the auxiliary links 500 form a "Y" shape, in which the angle D defined by the upper links 410 and the auxiliary links 500 stays constant. The oblique links 400 are coupled with both sides of the bottom surface of the basket 100. A support link 413 connects the link engagement portions 411 of the oblique links 400 to each other in the transverse direction so as to more firmly support the front and rear legs 300 which are rotated when the electric cart apparatus is being put into or taken out of the trunk T. In particular, the angle D defined between the upper links 410 and the auxiliary links 500 serves to facilitate the rotation of the front legs 200, the rear legs 300 and the links when the electric cart apparatus is being put into or taken out of the car.

In the electric cart apparatus according to this embodiment, the front legs 200 and the rear legs 300 are provided on the bottom corners of the basket 100, and the wheels 600 are provided on the lower ends of the legs 200 and 300. In addition, the oblique links 400 and the auxiliary links 500 are provided in oblique directions between the front and rear legs 200 and 300 such that the angle D between the upper links 410 and the auxiliary links 500 stays constant. When the electric cart apparatus is being put into the car, this configuration allows the auxiliary links 500 to continuously press against the rear legs 300 so that the front and rear legs 200 and 300 can completely rotate about the coupling portions 210 of the front legs 200. Consequently, the electric cart apparatus can maintain a desirable shape while the electric cart apparatus is being used as a cart or put into or taken out of the car. This is illustrated as an example in FIG. 2 to FIG. 6.

As shown in FIGS. 2-6, when the electric cart apparatus is put into the car, the electric cart apparatus is brought into contact with the trunk T before being pressed inward of the trunk T. When the electric cart apparatus is continuously pressed, the front legs 200 and the rear legs 300 start rotating about the coupling portions 210 of the front legs 200. The angle D defined by the upper links 410 of the oblique links 400 and the auxiliary links 500 stays constant. The front legs 200, the rear legs 300 and the links are rotated and put into the trunk T. In particular, it should be understood that the positions of the connecting points of the links and the distances between the links can vary depending on the design or condition.

In the case of putting the electric cart apparatus into the trunk T, when the angle defined between the upper links 410 and the lower links 430 of the oblique links 400 is greater than the angle that is maintained at present, the four-joint link operation is not enabled. The angle defined between the upper links 410 and the lower links 430 must be set so as not to exceed this angle. A device which prevents the angle defined between the upper links 410 and the lower links 430 from becoming greater is shown in FIG. 8 and will be described later.

FIGS. 7-10 are views showing the state in which the height of the electric cart apparatus is adjusted so that the basket 100 is lowered. In particular, FIGS. 7-10 show the operation stages in sequence in which a user lowers the height of the electric cart apparatus after having taken it out of a vehicle such as an SUV or crossover vehicle, in which the height of the floor of the trunk T is high.

FIG. 7 shows the electric cart apparatus right after being taken out of the trunk T, in which all components, including the joints 230 of the front legs 200, the joints 310 of the rear legs 300 and the link engagement portions, are locked.

FIG. 8 is an enlarged view of part "A" in FIG. 7, in which the coupling relationship of the upper link 410, the lower link 430 and the auxiliary link 500 are shown in detail. When the user uses the electric cart apparatus, the connecting portions of the front legs 200, the rear legs 300 and the links of the electric cart apparatus must stay locked and be supported firmly so that the electric cart apparatus can maintain a uniform shape without falling down or collapsing.

Therefore, as shown in FIG. 8, a first extension 415 protrudes downward from the upper link 410 of each of the oblique links 400 and a second extension 510 protrudes upward from a position of each of the auxiliary links 500 that corresponds to the first extension 415 of the upper link 410. The first extension 415 and the second extension 510 can be coupled with or decoupled from by a first stopper 530 such that they are coupled with each other in a locking state and decoupled from each other in an unlocked state. Accordingly, the angle between the upper link 410 and the auxiliary link 500 can stay constant.

The upper link 410 and the auxiliary link 500 are coupled with each other via the link engagement portion 411. The link engagement portion 411 is configured so as to slide inside the sliding slot 431 of the lower link 430. The lower link 430 of the oblique link 400 has a first protrusion 433 which protrudes upward, and the upper link 410 of the oblique link 400 has a second protrusion 417 which protrudes downward. The first protrusion 433 and the second protrusion 417 can be coupled with or decoupled from each other via a second stopper 419. Accordingly, the angle D between the upper link 410 and the lower link 430 can stay constant when putting the electric cart apparatus into the trunk T.

Therefore, as shown in FIG. 9, as the upper sections of the front and rear legs 200 and 300 are retracted into the lower sections of the front and rear legs 200 and 300, the portion of the auxiliary link 500 which are coupled with the rear legs 300 are unlocked therefrom. Since the angle D between the upper links 410 and the auxiliary links 500 must stay constant after the auxiliary links 500 are unlocked from the rear legs 300, the link engagement portions 411 slide along the sliding slots 431, and the upper links 410 and the auxiliary links 500 are lowered gradually. At this time, the actuators AC are controlled so as not to suddenly operate so that the upper links 410 and the auxiliary links 500 are lowered at a preset speed. In addition, it can be appreciated that the upper ends of the lower links 430 protrude gradually toward the rear legs 300 as the link engagement portions 411 slide gradually along the sliding slots 431.

Figure 10:
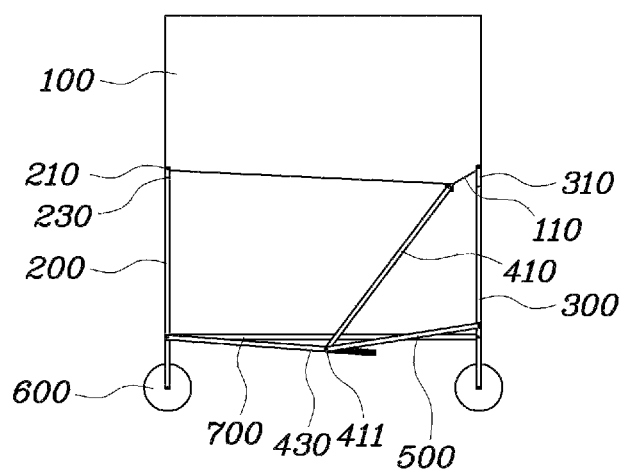
FIG. 10 is a schematic view showing a third operation stage when the electric cart apparatus is taken out of the car.

FIG. 10 shows the state in which the basket 100 is lowered completely. Here, the upper sections of the front and rear legs 200 and 300 are completely retracted into the lower sections of the front and rear legs 200 and 300. The link engagement portions 411 slide along the entire length of the sliding slots 431 of the lower links 430. The angle D between the upper links 410 and the auxiliary links 500 stays constant before, during and after the sliding. In this fashion, the operation of lowering the basket is completed.

FIG. 11 shows an example of parts which impart a follow-up function to the electric cart apparatus. The electric cart apparatus according to an embodiment of the present invention is provided with components, such as a sensor, a camera, a laser scanner and the like, which can be used for a receiver device 800 which can receive signals. When the user transmits a signal to the receiver device 800 using a transmitter device 900, the receiver device 800 receives the transmitted signal. Based on the received signal, the electric cart apparatus can follow the user who possesses the transmitter device 900 so that the user can more easily move without pushing the electric cart apparatus by himself/herself.

The electric cart apparatus as described above can make the shopping experience of a user more convenient since the cart is configured to follow the user even if the user does not push the cart by himself/herself. The user can put or take the heavy cart into or out of the trunk by lightly pushing or pulling the handlebar. The inconvenience of moving heavy goods from the cart into the car is eliminated. The electric cart apparatus can be easily applied to a vehicle such as an SUV or crossover vehicle in which the trunk is positioned high. It is easy to operate the electric cart apparatus as a result of a simple structure.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. An electric cart apparatus, comprising:
   a basket in which objects are to be held, wherein the basket comprises an inclined section on a lower edge of a rear portion, the inclined section being inclined inward and downward from a side surface of the basket at a predetermined angle;
   a plurality of front and rear legs which are erected downward from the basket;
   oblique links, wherein first ends of the oblique links are coupled with the basket and second ends of the oblique links are coupled with lower sections of the front legs, each of the oblique links being divided into an upper link and a lower link, the lower link having a sliding slot which extends in a lengthwise direction, and the upper link having a link engagement portion which is to move along the sliding slot;
   auxiliary links, wherein first ends of the auxiliary links are coupled with link coupling portions of the oblique links, and second ends of the auxiliary links are coupled with central portions of the rear legs; and
   wheels coupled with lower ends of the front and rear legs.

2. The electric cart apparatus according to claim 1, further comprising a handlebar provided on a rear portion of the basket.

3. The electric cart apparatus according to claim 1, wherein one end of each of the oblique links is coupled with a lower portion of the inclined section of the basket.

4. The electric cart apparatus according to claim 1, wherein the front legs are coupled with the front portions of the basket, thereby forming coupling portions between the basket and the front legs, and the front legs and the rear legs rotate about the coupling portions which act as the center of rotation when putting or taking the electric cart apparatus into or out of a car.

5. The electric cart apparatus according to claim 1, wherein each of the front and rear legs comprises a joint at a central portion thereof, wherein an upper leg of each of the front and rear legs is retracted into or withdrawn from a lower leg of each of the front and rear legs about the joint so that the basket is lifted or lowered about the joint so that a height of the basket is adjustable.

6. The electric cart apparatus according to claim 5, wherein each of the front and rear legs comprises an actuator such that the basket is lifted and lowered about the joint in response to an operation of the actuator so as to adjust the height of the basket.

7. The electric cart apparatus according to claim 1, wherein each of the rear legs comprises a joint at a central portion such that each of the rear legs is bendable at a predetermined angle in a predetermined direction.

8. The electric cart apparatus according to claim 1, further comprising reinforcement links provided on lower portions of the front and rear legs so as to form a shape of a quadrangle, four vertices of the quadrangle being positioned at the front and rear legs, respectively.

9. The electric cart apparatus according to claim 1, wherein the oblique links are disposed on both sides of the basket,
   the electric cart apparatus further comprising a support link which connects link engagement portions of the oblique links to each other in a transverse direction.

10. The electric cart apparatus according to claim 1, wherein the oblique links and the auxiliary links define a "Y" shape, an angle defined by the upper and lower links of each of the oblique links staying constant.

11. The electric cart apparatus according to claim 1, wherein the upper link of each of the oblique links has a first extension protruding downward, and each of the auxiliary links has a second extension protruding upward from a position that corresponds to the first extension, the first extension being capable of coupling with or decoupling from the second extension via a first stopper.

12. The electric cart apparatus according to claim 1, wherein the lower link of each of the oblique links has a first protrusion protruding upward, and the upper link of each of the oblique links has a second protrusion protruding downward, the first protrusion being capable of coupling with or decoupling from the second protrusion via a second stopper.

13. The electric cart apparatus according to claim 1, wherein the wheels comprise Mecanum wheels.

14. The electric cart apparatus according to claim 1, wherein the basket, the front legs, the rear legs, the oblique links, the auxiliary links and the wheels are electrically connected via one signal and are selectively controlled so as to be individually or simultaneously locked or unlocked.

15. The electric cart apparatus according to claim 1, wherein the basket is provided with a receiver device, and a transmitter device is provided outside the electric cart apparatus, wherein the receiver device detects a signal from the transmitter device such that the electric cart device follows the transmitter device.

\* \* \* \* \*